US012798490B2

(12) United States Patent
Broussard et al.

(10) Patent No.: US 12,798,490 B2
(45) Date of Patent: Nov. 17, 2026

(54) VEHICLE DOOR-MOUNTED ADJUSTABLE FIREARM HOLDER

(71) Applicant: Ready to Shoulder LLC, Richland, WA (US)

(72) Inventors: Michael Broussard, Richland, WA (US); Matthew Clarke, West Richland, WA (US)

(73) Assignee: Ready to Shoulder LLC, Richland, WA (US)

( * ) Notice: Subject to any disclaimer, the term of this patent is extended or adjusted under 35 U.S.C. 154(b) by 85 days.

(21) Appl. No.: 18/927,584

(22) Filed: Oct. 25, 2024

(65) Prior Publication Data

US 2026/0116308 A1 Apr. 30, 2026

(51) Int. Cl.
*B60R 7/14* (2006.01)

(52) U.S. Cl.
CPC ..................................... *B60R 7/14* (2013.01)

(58) Field of Classification Search
CPC ....................................................... B60R 7/14
USPC .......... 224/400; 248/229.14, 229.15, 229.25, 248/228.8
See application file for complete search history.

(56) References Cited

U.S. PATENT DOCUMENTS 2,416,828 A * 3/1947 Hamre .................. A01K 97/10 248/515
2,516,759 A * 7/1950 Diderrich .............. A01K 97/10 248/515
2,750,088 A * 6/1956 Agostini ................ F41A 23/18 211/64
3,273,769 A * 9/1966 Miller ....................... B60R 7/12 224/546
3,556,363 A * 1/1971 Whittaker ................. B60R 7/14 224/552
4,057,180 A * 11/1977 Whittaker ................. B60R 7/14 248/316.1
4,823,673 A * 4/1989 Downing ................ F41A 23/34 89/37.04
6,802,483 B1 * 10/2004 Leasure .................... F41B 5/14 182/187
11,110,867 B2 * 9/2021 Franklin ............... A47F 7/0028

(Continued)

*Primary Examiner* — Nathan J Newhouse
*Assistant Examiner* — Lester L Vanterpool
(74) *Attorney, Agent, or Firm* — AdamsIP, LLC; J. Hunter Adams

(57) ABSTRACT

A vehicle door gun mount for muzzle-down storage of long-barreled firearms is disclosed. The mount comprises an adjustable clamp for attachment to a door handle, a rotatable locking mechanism, and a sliding rod with U-shaped rests. The clamp uses paddles and knobs for secure, non-damaging installation. The rotatable locking mechanism allows angle adjustment of the sliding rod, which can be locked in place. The U-shaped rests may incorporate features for improved grip, stability, and customization. The mount is constructed from durable materials selected for strength, corrosion resistance, and environmental resilience. Installation requires no tools and avoids permanent vehicle modifications. The muzzle-down configuration and adjustable components improve safety and versatility compared to traditional gun mounts. This user-friendly design addresses key issues with existing mounts, offering a more adaptable and safety-conscious solution for firearm transportation in vehicles.

20 Claims, 9 Drawing Sheets

(56) References Cited

U.S. PATENT DOCUMENTS

| | | | | |
|---|---|---|---|---|
| 2014/0204569 | A1* | 7/2014 | Banagas | F21V 19/02<br>362/191 |
| 2014/0312087 | A1* | 10/2014 | Malingen | B60R 7/14<br>224/539 |
| 2017/0115087 | A1* | 4/2017 | Di Carlo | B60R 7/14 |

* cited by examiner

VEHICLE DOOR-MOUNTED ADJUSTABLE FIREARM HOLDER

FIELD OF INVENTION

The present disclosure relates to firearm transport apparatuses, and more particularly to gun racks and gun mounts.

BACKGROUND

Gun mounts have long been utilized by law enforcement officers, military personnel, hunters, outdoor enthusiasts to secure firearms within vehicles, particularly trucks. These devices serve the crucial function of safely storing and transporting rifles during hunting trips or other outdoor activities. By providing a stable and secure mounting point, gun racks help prevent damage to firearms and reduce the risk of accidental discharge while traveling over rough terrain. Furthermore, dust and debris commonly tracked into vehicles is less like to clog firearm barrels and mechanisms when the firearm is securely mounted above the floor of the vehicle. As such, gun mounts present a meaningful improvement to firearm safety, care, and maintenance over loose means of transport, such as placing a firearm on the back or front passenger seat.

As hunting and outdoor recreation continue to evolve, so too have gun mount designs for trucks. Modern systems may include features such as quick-release mechanisms for rapid firearm access, weather-resistant materials to protect against the elements, and adjustable components to accommodate various firearm sizes and styles. Despite these advancements, there remains an ongoing need for improved gun mount solutions that balance security, accessibility, and versatility for vehicle-based firearm transportation.

Traditional gun mounts for trucks typically consist of a horizontal rack system that can be installed in the rear window area of the cab or along the bed of the pickup truck. These racks often feature padded cradles or clips designed to hold multiple rifles in place, protecting them from scratches and impacts during transit. Some models also incorporate locking mechanisms to deter theft and ensure compliance with local firearm transportation laws. Some modern gun mounts are designed to be installed in the front of the vehicle's cab to facilitate retrieval and use without reaching to the rear of the vehicle. Of these, many gun mounts available on the market are installed upon the driver's side door of the vehicle for easy storage and access. However, these models are not without their shortcomings.

Driver's side door gun mounts on the market lack many features that improve user experience, resulting in designs that range from the inconvenient to the dangerous. The limitations of existing driver's side door gun mounts can extend to impacting safety, vehicle integrity, and efficiency. The upward-pointing barrel configuration, common in many current designs, poses a significant safety risk. In the event of an accidental discharge, the trajectory of the projectile could endanger the vehicle's occupants or nearby individuals. This design flaw contradicts fundamental firearm safety principles, which emphasize controlling the muzzle's direction at all times and directing it away from vulnerable individuals. Ergonomic considerations are also paramount in vehicle-mounted gun racks. Rigid strut or frame-based mounts that protrude significantly into the driver's space can create physical obstructions. These may interfere with the driver's ability to enter or exit the vehicle comfortably, adjust their seating position, or access vehicle controls. Such impediments not only detract from the driving experience but could potentially compromise safety by distracting the driver or limiting their range of motion.

Installation challenges present another critical issue. Many firearm gun mounts require screws or bolts to penetrate the door itself to secure the apparatus. The requirement for power tools and drilling into the door structure not only complicates the mounting process but also introduces risks to the vehicle's integrity. Modern vehicle doors often contain complex electronic systems, including power window mechanisms, lock controls, and speaker wiring. Drilling without precise knowledge of these components' locations could result in costly damage. Moreover, the potential compromise of side airbag systems is particularly concerning, as it could impair crucial safety features designed to protect occupants during collisions. These installation challenges are compounded if the intended mount is not easily adjustable for every type of firearm utilized by the hunter, necessitating multiple mounts. Firearms come in a wide range of sizes, shapes, and configurations, from compact carbines to long-barreled rifles. A mount that cannot accommodate this variety forces hunters to either adapt their firearm choices to the mount or forego using the mount altogether, negating its intended benefits. This inflexibility is particularly problematic for hunters who may use different firearms for various game or hunting conditions.

Lastly, the time factor involved in mounting and retrieving firearms is a crucial consideration for hunters. Designs that rely on complex strap systems for securing firearms can be cumbersome and time-consuming to operate. In hunting scenarios where quick access to a firearm may be necessary, such as when unexpectedly encountering game, these delays can be particularly frustrating. The extra time spent wrestling with straps or mechanisms could mean the difference between a successful hunt and a missed opportunity. The disclosed invention is a compact, door-mounted, easily removable, adjustable firearm mount that surpasses the shortcomings of gun mounts in the prior art. Suitable for rifles, shotguns, muzzleloaders, and other long-barreled firearms, the disclosure teaches a means for safe, convenient, and efficient firearm transport.

SUMMARY

A vehicle door gun mount meant for the muzzle-down storage of long-barreled firearms to the side of a driver is provided. In one aspect, the present invention is a clamp-based apparatus that uses quick, non-damaging, reversible means to affix itself to the vehicle's door. In another aspect, the present invention is a means by which long-barreled firearms may be securely transported by car or truck, reducing the risk of damage. In yet another aspect, the present invention is a compact, adjustable mount that permits easy mounting and retrieval of a firearm. In still another aspect, the present invention is a method of installing a gun mount upon a car or truck door using adjustable clamps. Generally, the present invention replaces traditional gun mounts which have permanent installation requirements, bulky frames, or complex means of affixing firearms.

The gun mount comprises a main body with an adjustable clamp, wherein said clamp is sized to fit within the handle of a truck or car door and is formed by one or more vertical sets of paired paddles affixed by a hinge or pivot attached near the top of the length of said paddles. The main body further comprises one or more knobs (the "clamp knobs"), each joined to a blunt screw that transfixes the main body of the invention such that the screw's opposite terminus presses against the portion of the clamp paddle above the pivot and thereby prevents the clamp from loosening. By such means, this clamp paddle or paddles (the "mobile paddles") acts in conjunction with the opposite paddle or paddles (the "static paddles") to keep the entire apparatus in place upon the vehicle door.

The gun mount further comprises a rotating cylindrical locking mechanism affixed above the described clamp. A knob flush to the same side of the apparatus as the mobile paddles (the "locking knob") has internal threading complementary to the external threading on a blunt screw with a wide terminal protrusion (the "locking screw") that transfixes the rotatable locking mechanism. The rotatable locking mechanism is capable of being twisted about its axis; this property in conjunction with the permits the sliding rod to be arranged at whichever angle and height the installer requires. When the rotatable locking mechanism has reached its desired angle, the locking knob will be twisted to pull the locking screw into the locking knob via their complementary threading, thereby causing the terminal protrusion to pull against the assembly and keep it in place via frictional forces.

The end of the rotatable locking mechanism opposite the locking screw terminates in a semicylindrical space, which runs perpendicular to the rotatable locking mechanism. Incorporated within said space is a sliding rod, kept in place by a terminal cap with a complementary semicylindrical space. Attaching said cap to the rotatable locking mechanism are a plurality of screws, which can be easily tightened or loosened to alter the friction acting upon the rod and allow it to slide through the housing. Each end of said sliding rod terminates in a U-shaped gun rest, such that the upturned rest is perpendicular to the sliding rod. Upon installation, the sliding rod will thereby be positioned such that one end (the "front end") is positioned toward the front of the vehicle and the other (the "back end") is pointed toward the rear of the vehicle. In a preferred embodiment highly recommended by the inventors, the back end of the sliding rod is higher than front end such that a long-barreled firearm mounted upon the apparatus will be angled muzzle-down towards the floor of the vehicle.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure. For instance, though depicted as a replacement for other driver's side door gun mounts, the invention could also be configured to be installed on the passenger's side door.

Further, it should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally. The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components. As defined herein, the word substantial means more than half of the length.

Figure 1:
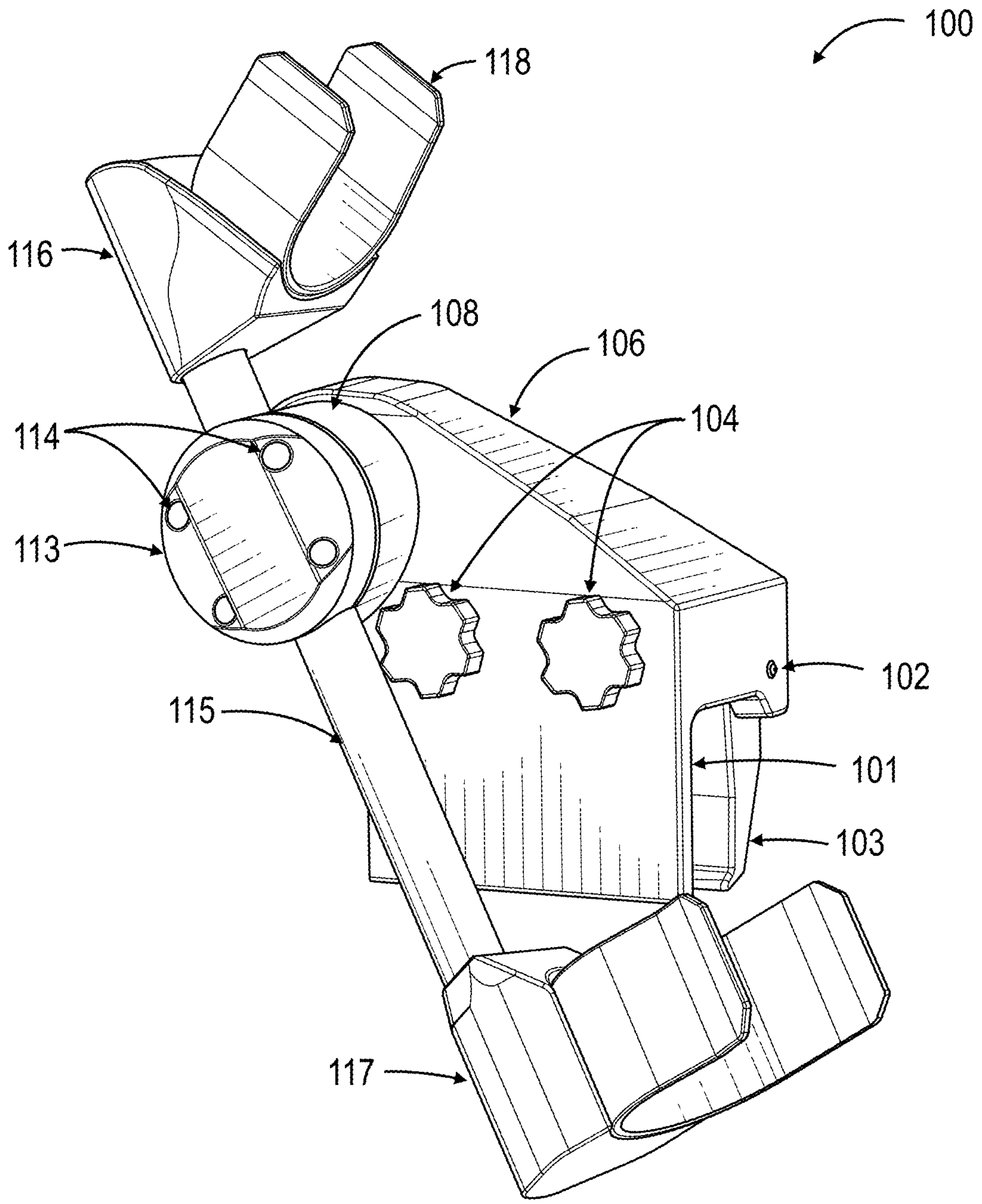
FIG. 1 illustrates a driver's side front-angled view of the invention, showing the sliding rod, U-shaped rests, rotatable locking mechanism, and clamp knobs, and static paddles of the clamp consistent with the principles of the present disclosure.
Figure 2:
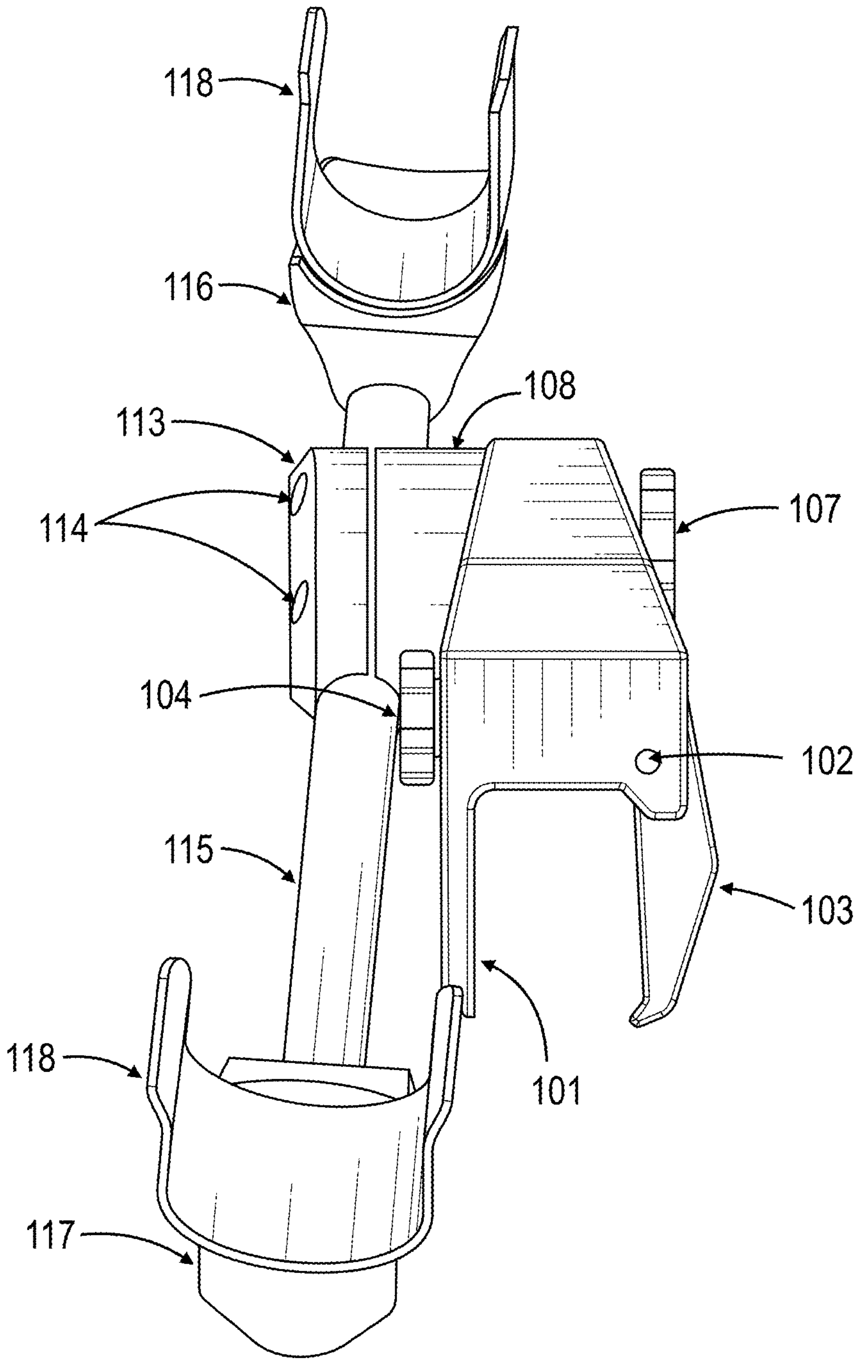
FIG. 2 illustrates a frontal view of the invention, showing the clamp formed by the mobile and static paddles consistent with the principles of the present disclosure.
Figure 3:
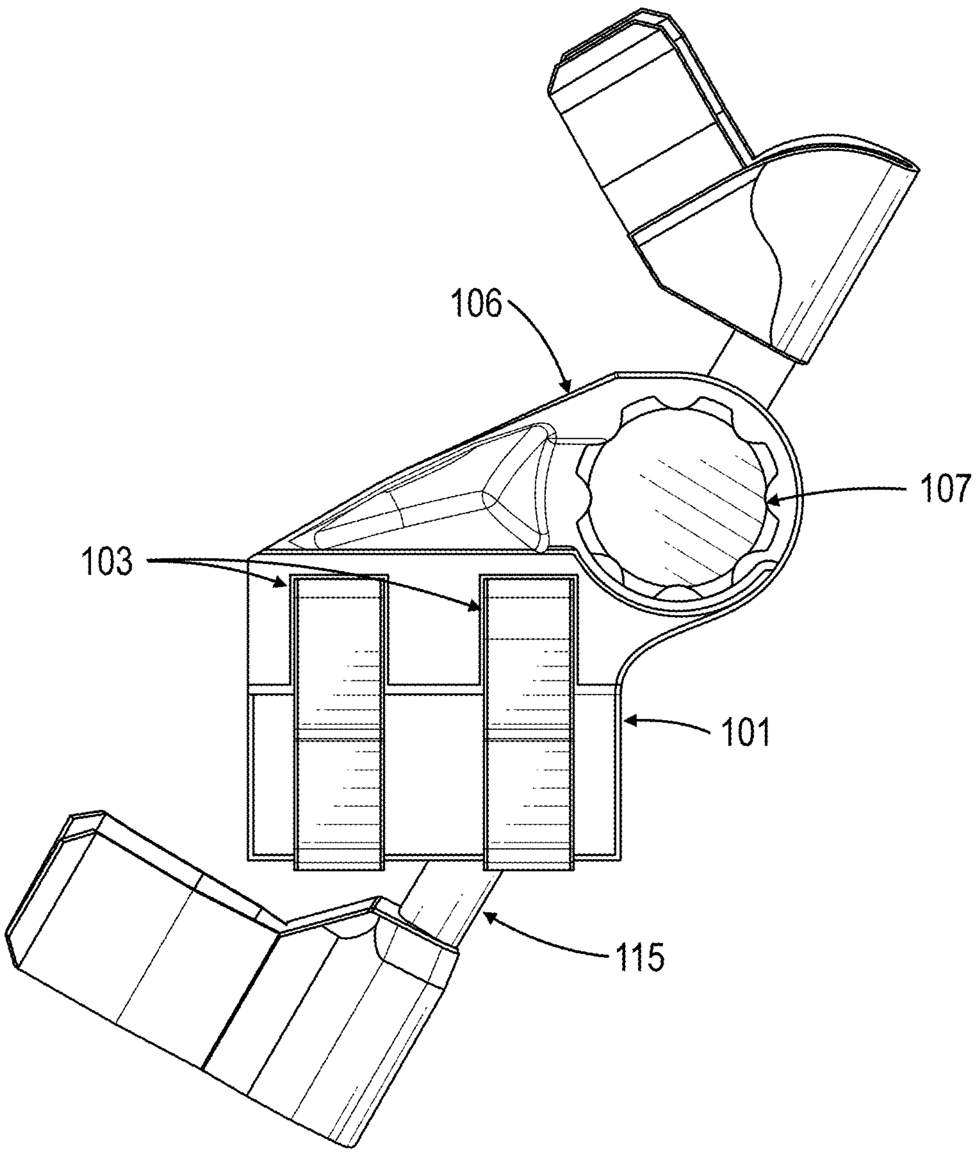
FIG. 3 illustrates a door-side view of the invention, showing an embodiment with two mobile paddles, one static paddle, and the locking knob covering one end of the cylindrical rotatable locking mechanism consistent with the principles of the present disclosure.
Figure 4:
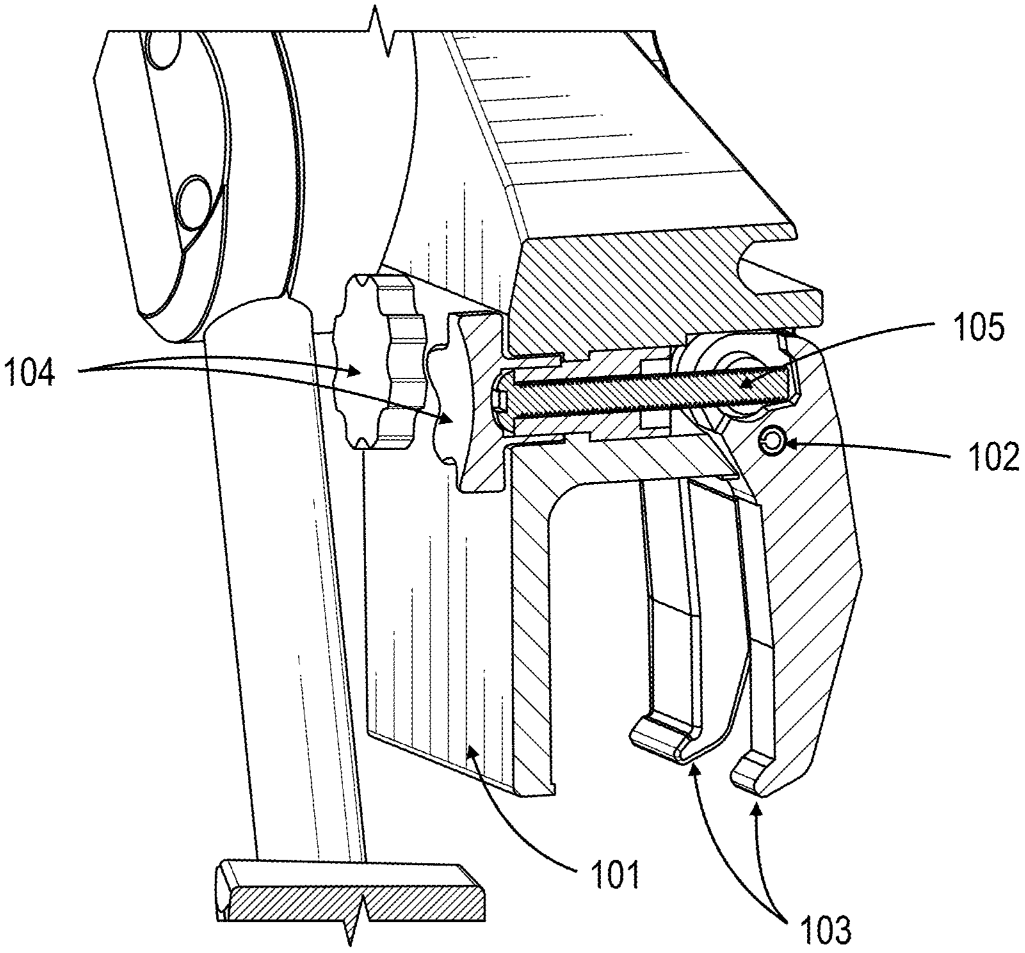
FIG. 4 illustrates a frontal cross-sectional view of the clamp, showing the internal structure of the clamp knob, screw, and mobile paddle consistent with the principles of the present disclosure.
Figure 5:
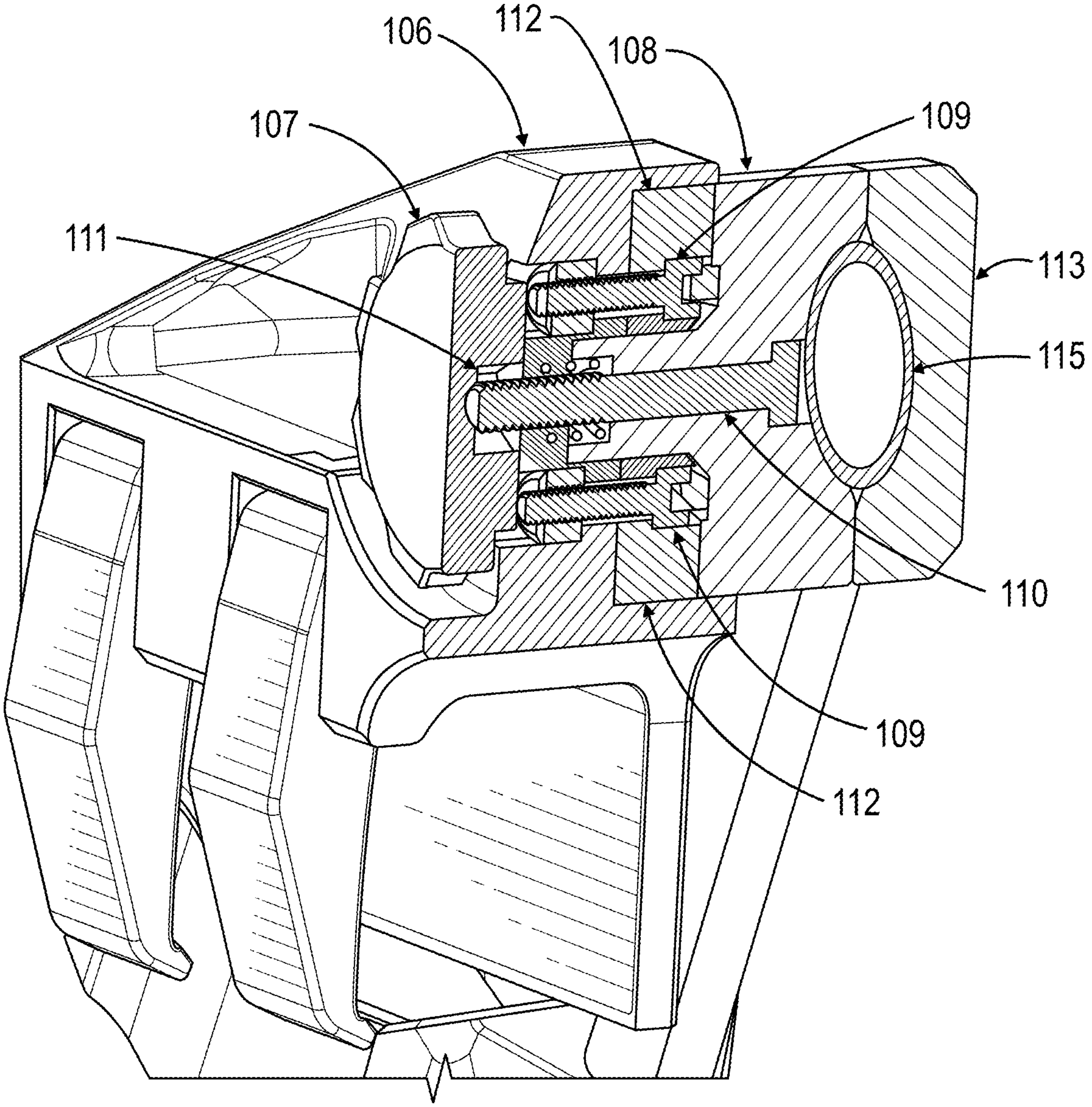
FIG. 5 illustrates a rear cross-sectional view of the rotatable locking mechanism, showing the internal structure of the locking knob, assembly locking mechanism, and screws consistent with the principles of the present disclosure.
Figure 6:
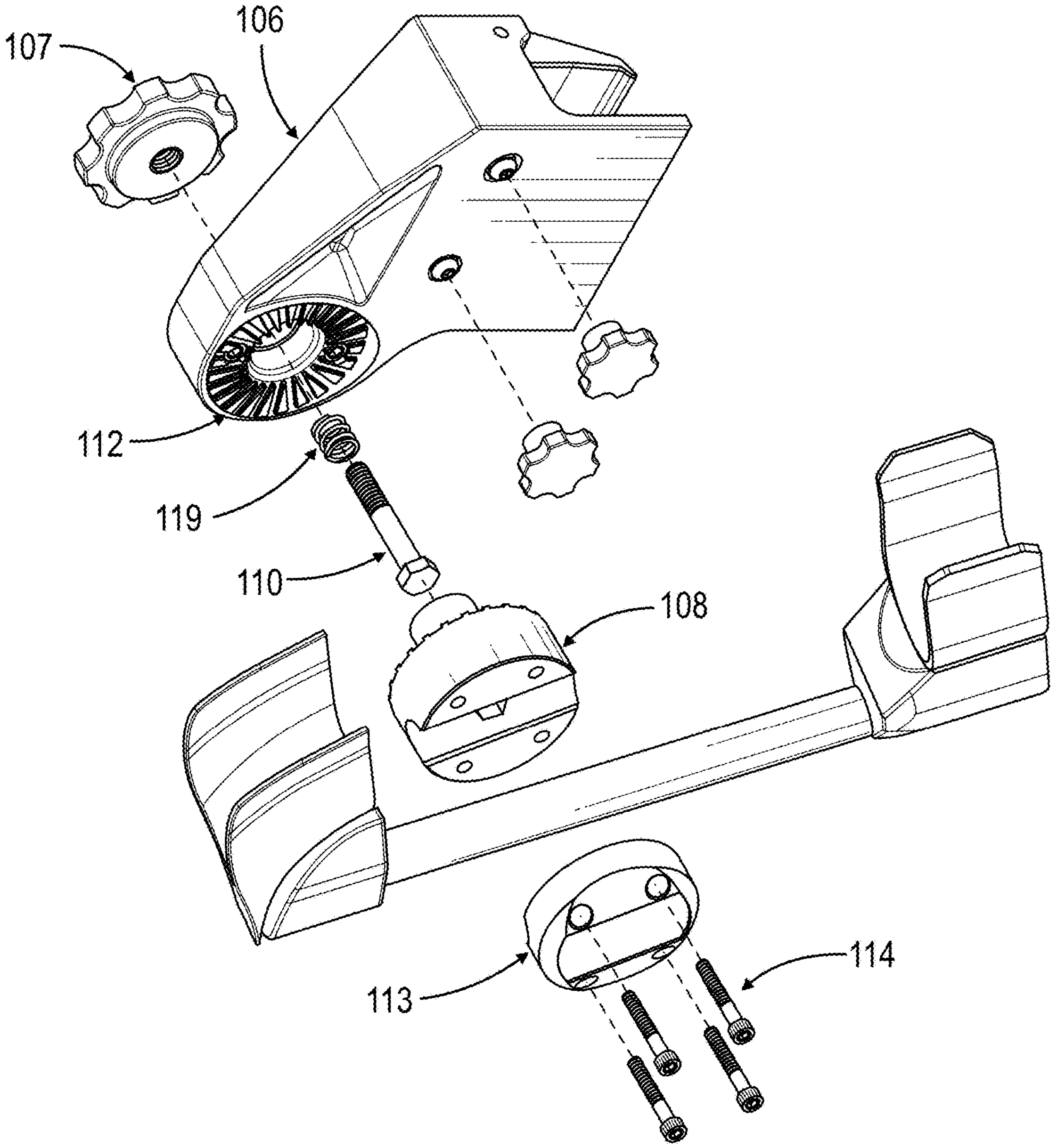
FIG. 6 illustrates a rear exploded view of the rotatable locking mechanism, drawing attention to the interlocking grooves and ridges of the main assembly piece and locking plate consistent with the principles of the present disclosure.
Figure 7:
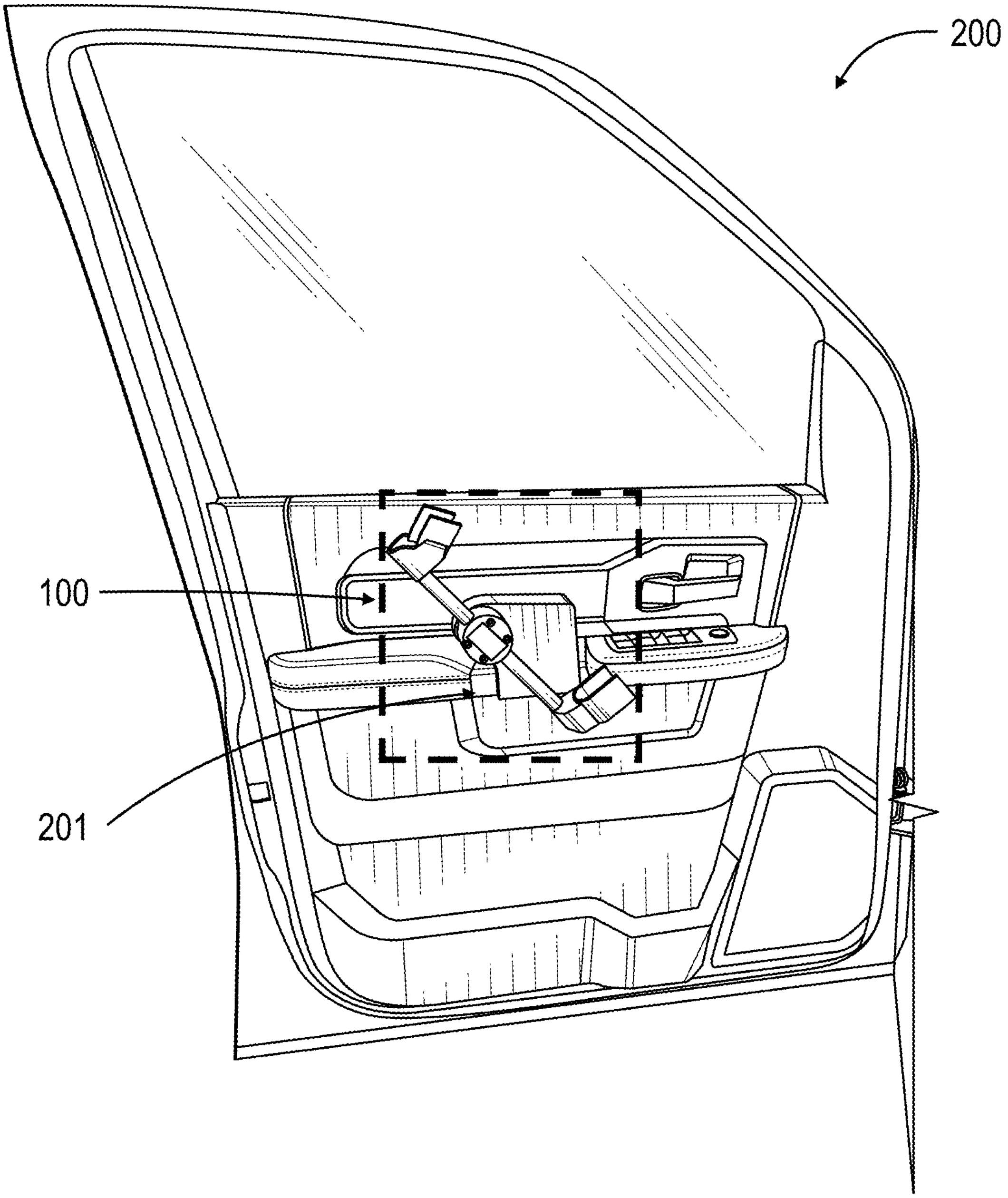
FIG. 7 illustrates a front view of the apparatus installed upon the door of a vehicle consistent with the principles of the present disclosure.
Figure 8:
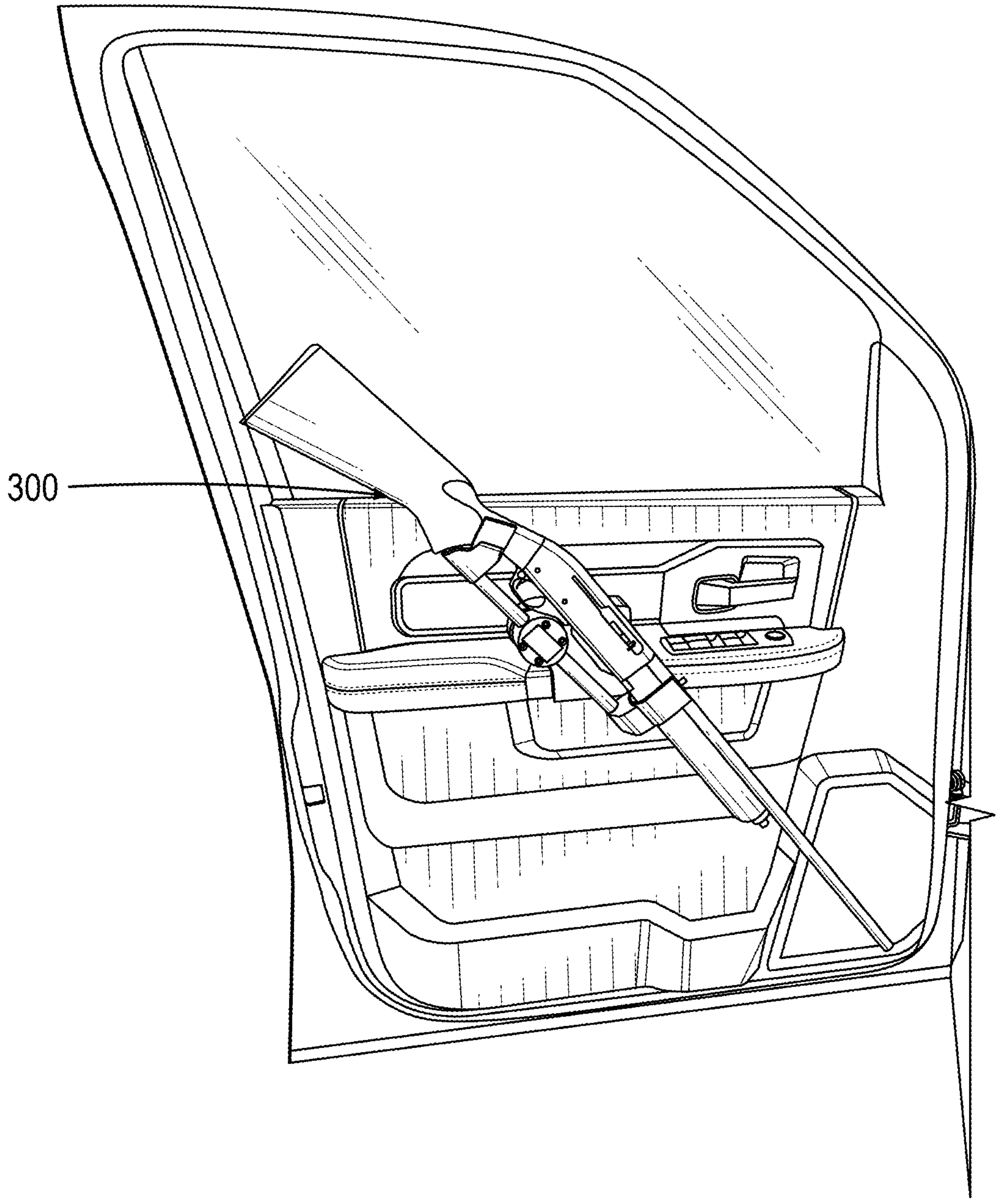
FIG. 8 illustrates a driver's side view of the apparatus installed upon the door of a vehicle with a firearm mounted in the U-shaped rests consistent with the principles of the present disclosure.
Figure 9:
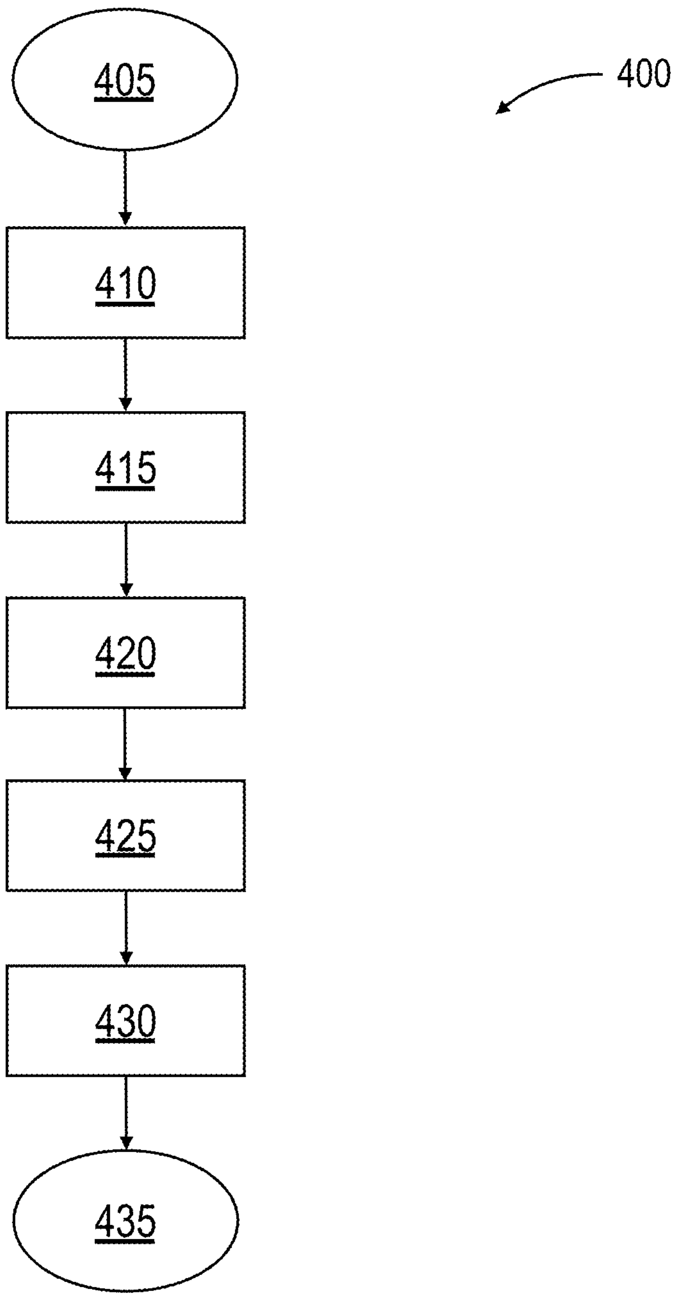
FIG. 9 illustrates a flowchart detailing the method of installing the apparatus on the door of a vehicle consistent with the principles of the present disclosure.

FIGS. 1-9 illustrate a preferred embodiment of a system 100 designed to be mounted upon the handle of a vehicle door. FIG. 1 illustrates a frontal driver's side angled view of the system 100, with the sliding rod 115, front and back U-shaped rests 118, front linker 117, and back linker 116 facing the driver. FIG. 2 illustrates a frontal view of the invention, with particular attention given to the clamp. FIG. 3 illustrates a door-side view of a preferred embodiment of the system. FIG. 4 illustrates the internal function of the clamp in a frontal, cross-sectional view. FIG. 5 illustrates the internal workings of the rotatable locking mechanism via a rear cross-sectional view of the system 100. FIG. 6 illustrates an exploded view of the rotatable locking mechanism, enumerating the components necessary for the function of the system 100 and showing the internal structure of the rotatable locking mechanism. FIG. 7 illustrates the system 100 clamped in place on vehicle door 200. FIG. 8 illustrates the system 100 being used by a user to secure a long rifle to the interior of a vehicle, wherein said firearm is positioned in a downward direction. FIG. 9 illustrates method that may be carried out by a user of the system 100 to secure a firearm within the interior of a vehicle. It is understood that the various method steps associated with the methods of the present disclosure may be carried out by a user using the system 100 depicted in FIGS. 1-8.

In a preferred embodiment, as illustrated in FIG. 1, the front linker is perpendicular to the sliding rod and the back linker forms an obtuse angle with said sliding rod. In other preferred embodiments, the front linker is not perpendicular to the sliding rod. In yet other preferred embodiments, the back linker forms an acute angle with said sliding rod. The sliding rod is preferably kept within its sliding track via housing cap 113, which is affixed to the main assembly body 108 via an affixing element 114. In a preferred embodiment, the affixing element comprises cap screws. In another preferred embodiment, the affixing element 114 comprises bolts, which may be composed of a corrosion-resistant metal, such as stainless steel. The affixing element 114 may be tightened or loosened to facilitate the motion or locking in place of the sliding rod. The rotatable locking mechanism fits within a linker piece 106 such that it can rotate without the sliding rod or rests colliding with other pieces of the system 100. The linker piece 106 fits onto the top of the adjustable clamp, wherein said clamp preferably comprises a static paddle 101, mobile paddle 103, pivot 102, and clamp knobs 104.

In a preferred embodiment, as illustrated in FIG. 2, the top segment of the clamp is of a piece with the static paddle 101 for superior stability. However, in some preferred embodiments, the top of the clamp is distinct in piece or material from the paddles. In another preferred embodiment, the static paddle 101 is not static but is another mobile paddle, necessitating a clamp knob on the door-side of the system 100. Replacing the static clamp with a mobile clamp improves flexibility and improves the system's 100 capacity to clamp onto even the narrowest of door handles. The pivot 102 serves as the fixed point upon which the mobile paddles 103 turn when shifted by the clamp knob 104. The locking knob 107 is visible in the background of the figure. The locking knob 107 is preferably adjacent to linker piece 106, itself affixed to static paddle 101, as illustrated in FIG. 3. Both mobile paddles 103 are displayed in relation to the static paddle.

As illustrated in FIG. 4, the clamp knob 104 is preferably affixed to one end of clamp screw 105, which transfixes the top segment of static paddle 101. The purpose of the clamp screw is to transform rotation applied to the clamp knob into movement toward or away from the mobile paddle 103. The opposite end of the screw presses against the top of the mobile paddle, forcing it to rotate around the pivot 102 and thereby tighten the clamp. In a preferred embodiment, as illustrated in FIG. 4, there exists a small, curved cavity atop the mobile paddle so the screw can slide and maintain tight contact with the paddle. In a preferred embodiment, the material comprising the housing about the clamp screw is selected based on its frictional properties, balancing the need for it to remain unmoving so the mobile paddle is secured with the need for it to be adjustable. In another preferred embodiment, the pivot 102 comprises a central bolt with a lubricious coating to facilitate the easy slide of the mobile paddles. In yet another preferred embodiment, the pivot 102 instead comprises a hinge.

As illustrated in FIG. 5, the locking knob 107 preferably comprises complimentary internal threading to the external threading on locking screw 110, which transfixes the assembly and terminates in a blunt protrusion pressing against the other side of the rotatable locking mechanism. By twisting the locking knob, the locking screw is pulled into the locking knob's internal cavity 111, thereby pulling the protrusion against the main assembly body 108. The rotatable locking mechanism preferably contains a series of grooves and ridges complementary to grooves and ridges on the flat toroidal locking plate 112, such that when the locking screw presses the two together the assembly locks in place and can no longer rotate. This locking plate is preferably affixed to the linker piece 106 via assembly screws 109. In a preferred embodiment, the locking plate and assembly screws are constructed and assembled as shown in FIG. 5. In another preferred embodiment, however, the locking plate is of one piece with the linker piece 106, improving stability and rendering the assembly screws unnecessary. The end of the rotatable locking mechanism opposite the locking plate preferably further comprises a perpendicular semicylindrical space, which serves as one half of the housing for the sliding rod 115. The housing cap 113 is affixed to the end of the rotatable locking mechanism and preferably comprises the complimentary semicylindrical space, completing the housing for sliding rod 115.

As illustrated in FIG. 6, the grooves and ridges incorporated into the locking plate 112 are configured in a way such that they are present on the main assembly body 108. The internal threading in the locking knob 107 preferably corresponds with and is complementary to the external threading on locking screw 110. The locking spring 119 preferably wraps around the locking screw 110, fitting into the completed assembly in a way such that it exerts force upon both the locking plate 112 and the main assembly body 108, pushing the two pieces apart. Accordingly, the locking mechanism for the assembly will loosen upon the loosening of the locking knob, negating the need for the user to first loosen the knob and then pull the assembly into an unlocked state. In a preferred embodiment, the surface of the main assembly body that makes contact with the locking plate is treated with a lubricious coating to facilitate disengagement from the locked state, reduce spring warping, and improve apparatus lifespan by reducing wear while adjusting the angle of the sliding rod.

In a preferred embodiment, the apparatus's clamp is affixed upon the vehicle door handle 201 to maintain its position, as illustrated in FIG. 7. In this preferred embodiment, the back rest of the system 100 is raised above the front end such that the sliding rod forms a 45° angle with the floor of the vehicle. FIG. 8 supplements this view with the addition of a firearm 300 mounted upon the system 100 with the muzzle down, the body of the weapon held in place by the U-shaped rests. In a preferred embodiment, the sliding rod is adjusted at the time of installation so that the mounted weapon does not protrude beyond the frame of the vehicle door, thereby allowing the door to be opened and closed normally. The ability to keep said firearm pointed down during transport is a central safety feature of the system 100, which when combined with a compact design—reducing the risk of jostling by a user of the system 100—increases maneuverability and safety during the transportation of a firearm.

The rotatable locking mechanism, door handle clamp, and their respective linker create the main body of the system 100. In a preferred embodiment, these components are constructed in a way such that they cannot be separated without disassembling the system 100 entirely. In another preferred embodiment, however, the main body includes a modular design to facilitate disassembly, replacement of worn or broken components, and customization of key pieces like the clamp or rotatable locking mechanism. In yet another preferred embodiment, the main body may include integrated shock-absorbing materials or components to further reduce vibration and potential damage to the firearm during transit. In many preferred embodiments, the main body of the system 100 is an ideal site for built-in cable routing channels or attachment points for integrating additional security measures such as gun locks or tethers. Generally, the main body of the system 100 is the starting point for one skilled in the art to contemplate the addition of structural or stabilizing features to embodiments of the disclosed invention.

Some preferred embodiments of the invention incorporate structural features that facilitate overall functionality rather than customizing one component or another. In one such embodiment, the system 100 may incorporate a secondary support arm that extends to the vehicle's floor. In another embodiment, the system 100 has a line or adjustable support arm that is affixed by a hook or clip to an overhead handle common to many vehicles. This feature could be especially useful in vehicles with limited floor space or for users who prefer to keep the floor area clear. The adjustability of this arm allows for customization based on the vehicle's interior dimensions and the user's preferences. These features not only provide additional support for heavier firearms but also helps distribute the weight more evenly, reducing stress on the door-mounted clamp. As such, these preferred embodiments could be particularly beneficial for users who frequently transport large-caliber rifles or shotguns with extended barrels. They may also serve to dampen vibrations during transit, further protecting the firearm from potential damage. Embodiments including these additional support features could be designed with quick-release mechanisms or folding capabilities to maintain the apparatus's ease of installation and removal. They might also incorporate similar materials and design elements as the main body of the mount, such as non-slip coatings or padded contact points, to prevent damage to the vehicle's interior. Furthermore, these structural additions could be modular in nature, allowing users to attach or detach them as needed based on the specific firearm being transported or the driving conditions anticipated.

The exact number of paddles, clamp knobs, and internal screws in the clamp may be changed by one skilled in the art without departing from the inventive disclosure. In a preferred embodiment, the clamp comprises one static paddle and two mobile paddles, the latter of which connected to one clamp knob and one screw a piece. In another preferred embodiment, the clamp comprises one static paddle and one mobile paddle, which is connected to one central clamp knob and one screw. In yet another preferred embodiment, the clamp comprises one static paddle and two mobile paddles connected by a strut or linking piece, upon which acts the clamp knob and screw so as to tighten both mobile paddles simultaneously. In still another preferred embodiment, the clamp comprises two static paddles and one mobile paddle, which may be connected to either one or two clamp knobs. In some embodiments, it is possible to have two static paddles and two mobile paddles, the latter of which are tightened by one clamp knob each or by a clamp knob acting upon a linking strut.

Paddle shape, construction, and texture are key to most embodiments of the disclosed invention. In a preferred embodiment, the paddles have rounded or padded edges to reduce the risk of injury upon contact with the system 100. In another preferred embodiment, the bottom edge of the paddles has a small lip to help reduce dislodging. In still another preferred embodiment, the inner facing portions of the paddles is ridged or textured to improve the clamp's grip on the door handle during installation. In these and other embodiments, the paddles may be coated with a non-slip material such as silicone, rubber, or neoprene to enhance grip and prevent scratching or compressive damage to the vehicle's door handle. In other preferred embodiments, paddles may also feature a contoured shape that matches the curvature of common door handle designs, allowing for a more secure and customized fit. For optimizing on-site installations, a preferred embodiment of the invention further comprises modular paddle attachments to alter the shape and surface properties of the paddle and ensure ideal fits. Another embodiment may feature paddles with adjustable width, utilizing a telescoping or sliding mechanism that allows users to fine-tune the paddle spacing to match their specific door handle dimensions. This adjustability may be achieved through a series of interlocking notches or a ratchet-like system that maintains the chosen width during use. These implementations do not represent all paddle implementations consistent with the subject matter described herein but are examples consistent with the disclosed subject matter. Although variations have been described in detail above, other modifications or additions may be possible.

The physical clamp and locking knobs play a crucial role in the functionality and user experience of the gun mount apparatus. The preferred embodiment features circular knobs with peripheral divots, which serve to enhance grip without altering the knob's material composition. This design choice balances tactile functionality with manufacturing simplicity. However, recognizing the diverse preferences and needs of users, several alternative preferred embodiments are proposed. A different preferred embodiment presents a smooth circular knob without divots or textural modifications. This design prioritizes aesthetic simplicity and may be advantageous in environments where debris accumulation is a concern. For users who prefer distinct tactile feedback or have specific ergonomic requirements, further preferred embodiments offer knobs in hexagonal, square, triangular, or other polygonal shapes. These geometric variations can provide improved torque application and may be particularly beneficial for users with limited dexterity or when operating the mount while wearing gloves, such as cold-weather hunters. Recommended features of such embodiments include rounded edges to provide a smooth appearance or divots to further improve grip upon the knob. In another preferred embodiment, the knob design incorporates ridges or non-slip materials such as rubber, silicone, or neoprene around the knob's periphery. This design improves handling in adverse conditions, such as wet or cold environments often encountered during hunting or outdoor activities.

In a preferred embodiment, the locking knob is located on the door-side base of the cylindrical rotatable locking mechanism and contains threading complementary to a screw with a blunt circular protuberance. When the locking knob is twisted, the threading pulls the screw into its internal cavity, pulling its protuberance against the rotatable locking mechanism and the assembly against the complementary locking plate. In other preferred embodiments, the screw instead presses against a rounded pad contoured to the rotatable locking mechanism to more evenly distribute pressure across the rod's surface and thereby reduce wear. In a subset of these preferred embodiments, the pad is lined with a non-slip material like silicone, rubber, or neoprene to enhance grip and thereby reduce the risk that twisting the knob will merely rotate the screw and protuberance without tightening upon the assembly. In another preferred embodiment, the protuberance is hexagonal, square, ellipsoid, triangular, or another non-circular shape; when fitted into a complementary cavity on the assembly, this greatly reduces slippage.

In a preferred embodiment, the rotatable locking mechanism is used to adjust the angle of the sliding rod and thereby the angle of the mounted firearm. Some embodiments, however, contain additional features to enhance the function of the rotatable locking mechanism. As shown in FIG. 6, the rotatable locking mechanism incorporates a ratcheting and locking mechanism that allows for precise incremental adjustments of the sliding rod angle. This feature may provide finer control over the firearm's positioning. In another preferred embodiment, the rotatable locking mechanism may include a quick release locking lever, enabling rapid unlocking and repositioning of the rotatable locking mechanism without compromising stability as a mount. In yet another preferred embodiment, the rotatable locking mechanism may feature a spring-loaded detent system with predefined angle settings. This may allow users to quickly select common angles for different firearm types or hunting scenarios. Similarly, other preferred embodiments of the rotatable locking mechanism may incorporate a visual indicator or scale to display the current angle of the sliding rod, allowing for consistent setup across multiple uses. For the purposes of reducing noise and protecting the mounted firearm, a preferred embodiment of the rotatable locking mechanism may incorporate a dampening system to prevent sudden movements or drops when adjusting the sliding rod's position. In embodiments where exacting control of firearm mounting angle is paramount, the rotatable locking mechanism may comprise dual-axis rotation capability, allowing for both vertical and horizontal angle adjustments of the sliding rod.

The sliding rod is preferably kept in place by friction formed by the tight join between the housing cap and the rotatable locking mechanism, secured by an affixing element 114. However, in the majority of preferred embodiments the sliding rod is adjustable up and down within the housing to form the ideal fit for a user. This may be accomplished in a variety of ways. In a preferred embodiment, as illustrated in FIG. 1, cap screws may be tightened or loosened with a screwdriver to provide sufficient space to adjust the sliding rod as desired. In another preferred embodiment, the cap screws further comprise a tab which may permit the manual tightening or loosening of the housing cap. In yet another preferred embodiment, the housing cap is of one piece with the main rotatable locking mechanism, and the adjustment of the sliding rod is accomplished via other means. In another preferred embodiment, the system 100 comprises a slider knob attached to a screw which presses against the sliding rod. The housing in this embodiment is preferably constructed more loosely, and the affixing element 114 may be loosened or tightened by the slider knob to control the mobility of the sliding rod. In another preferred embodiment, the system 100 further comprises a friction based locking mechanism secured to the hole in the unified rotatable locking mechanism through which the sliding rod passes. This may be locked or unlocked to secure the sliding rod while avoiding the snag hazard a knob may pose to the driver's clothing.

The sliding rod disclosed in the present invention is subject to modification in some preferred embodiments. In a preferred embodiment, the sliding rod comprises a solid cylindrical rod of fixed length. In a different preferred embodiment, the sliding rod is telescoping from the back end, the front end, or both. This embodiment further comprises locking mechanisms about the intersection of the telescoping layers that the installer may use to fix the rod at the desired length. A related embodiment is similarly telescoping, but in place of a lock, a compressible, spring-loaded button and a series of holes along the length of the rod allows the rod to be set at a variety of predetermined lengths. Telescoping embodiments regardless of locking mechanism may include markings or measurements along its length, allowing users to easily replicate preferred setups or adjust to specific firearm lengths. In another preferred embodiment, the rod does not change length, but it is hollow to reduce the total weight of the system 100. Embodiments with hollow rods may incorporate further features to enhance user experiences; for instance, the space may be used for integrating firearm safety cables and locks without interfering with the rod's functionality, preventing dislodging and discouraging theft. In another preferred embodiment, the interior of the rod may incorporate a dampening material or mechanism to reduce vibration and noise during vehicle operation.

The shape of the rod can also play a role in improving the apparatus's functionality. In a preferred embodiment, the rod is cylindrical; however, cylinders are easily rotated at the locus where the sliding rod intersects with the rotatable locking mechanism. This functionality may be desirable when the mount is not directly vertical, but it introduces a complication during adjustment and a potential mechanical weak point. As such, some preferred embodiments alter the rod's shape to prevent rotation. In one such preferred embodiment, the rod may feature a non-circular cross-section, such as a square or hexagonal shape. In another preferred embodiment, the rod remains cylindrical but further comprises a groove along its length corresponding to a tooth in the housing where it intersects with the assembly. In embodiments where the U-shaped gun rests are modular, said groove or a series of notches along the sliding rod may provide natural anchoring points. With this non-comprehensive and non-limiting list of modifications, one skilled in the art may contemplate embodiments that customize the sliding rod without departing from the inventive disclosure.

In a preferred embodiment, a firearm is secured to the system via the U-shaped rest. The U-shaped rest is preferably affixed at each terminus of the sliding rod such that the open faces of the front rest are perpendicular to the sliding rod and the back rest forms an obtuse angle with the sliding rod. However, another preferred embodiment further comprises a hinge or pivoting means at the base of the U-shaped rest so the angle of the rest relative to the bar may be adjusted to better align with the mounted firearm. In a different preferred embodiment, the U-shaped rests are modular, capable of sliding along the sliding rod to improve the fit of the mounted firearm. In yet another preferred embodiment, the U-shaped rests do not slide along the rod but can be removed from the termini. In such an embodiment, the remaining rod can then slide out of the rotatable locking mechanism to facilitate storage; similarly, the U-shaped rests may incorporate a folding or collapsible design in some embodiment for compact storage when not in use. Generally, the integration of the U-shaped rests with the sliding rod should prioritize mechanical stability and customizability when contemplating ideal embodiments.

In a preferred embodiment, the lips of the U of the U-shaped rest are angled slightly outward to facilitate the loading of the firearm into place. For a similar purpose, another preferred embodiment of the U-shaped rest may be constructed of material that can compress slightly to load and snap into place around the firearm, accommodating changes in stock and barrel dimensions between firearm models. In yet another embodiment, the rests may feature an adjustable width in some implementations, allowing users to accommodate firearms of varying thicknesses or barrel diameters. Accordingly, some preferred embodiments of a U-shaped rest are configured such that a firearm may be secured in the U-shaped rest with no need for additional fastening/strapping. Additionally, as the stability of the mounted gun is key for safety and preventing damage, the grip of the rest upon the firearm is of paramount importance. As such, a preferred embodiment further comprises a lining for the U-shaped rest composed of soft, non-slip material like silicone. In a related preferred embodiment, the U-shaped rest is lined with ridges or another texture to strengthen frictional forces and prevent dislodging. To further prevent damage by minimizing vibration during transport, some embodiments of the U-shaped rests may include built-in shock absorption features, such as spring-loaded components or elastomeric materials.

U-shaped rests are furthermore ideal loci for security and stabilizing features of the system 100 in many preferred embodiments. The invention is designed to be fully functional and stable without the use of straps or locks; however, in another preferred embodiment, the U-shaped rests may include integrated locking mechanisms or attachment points for securing straps to further stabilize the mounted firearm. In a different preferred embodiment, one or more U-shaped rests has a paired set of gaps through which a bolt or clip may be affixed to secure the barrel of the firearm. These and other locking mechanisms may incorporate a quick-release mechanism that enable rapid removal or attachment of the firearm without compromising security. To prioritize customization, a preferred embodiment of the U-shaped rests features interchangeable inserts with different shapes or materials to customize the fit for specific firearm types or preferences.

The disclosed system 100 is designed to be used by hunters, outdoorsmen, and other individuals who plan to transport firearms through a variety of environmental conditions that may be inimical to delicate machinery. The selection of materials for the construction of the system 100, therefore, must consider a plurality of factors such as density, hardness, resistance to wear, resistance to corrosion, and limited thermal expansion or contraction. Generally speaking, the preferred embodiment comprises a sliding rod, as well as screws, gears, hinges, and other rigid internal components made of treated or untreated metal. Said preferred embodiment further comprises paddles, knobs, rests, and exterior casing made of high-performance polymer for superior weather and corrosion resistance. However, said embodiment is not limiting and one of ordinary skill in the art may construct another embodiment according to a different organizing principle. In a preferred embodiment, the majority of the exterior-facing pieces of the system 100 are constructed of materials expressly chosen for their resistance to wear. In another preferred embodiment, the faces or edges of mobile components such as the rotating gear assembly are treated with a lubricious coating to reduce wear and improve ease of operation.

Metal-based materials used for system 100 construction are generally selected for their strength, lightness, limited thermal expansion, and relative resistance to corrosion. In a preferred embodiment, the system 100 is largely constructed from anodized aluminum alloys, which offer a high strength-to-weight ratio, corrosion resistance, and limited thermal expansion. In another preferred embodiment, aerospace-grade aluminum-lithium alloys are used instead for their high strength and low density. In yet another embodiment, the system 100 contains components made of titanium alloys to capitalize on their high strength, low density, and excellent corrosion resistance. In multiple embodiments, zinc alloys or nickel-plated brass may be used to provide corrosion resistance and durability for smaller components. Embodiments emphasizing strength, corrosion resistance, and durability over lightness may contain one or more components made from stainless steel, particularly marine-grade varieties. Similarly, another preferred embodiment incorporates powder-coated steel components for a durable, corrosion resistant finish on a strong base material. Likewise, ceramic-coated metals feature enhanced hardness and wear resistance in components likely to be exposed to the elements.

Polymer and composite based materials used in the construction of the system 100 are similarly selected for their strength, lightness, and resistance to both wear and corrosion. In a preferred embodiment, one or more of the components are constructed from high-density polyethylene (HDPE), known for its chemical resistance, impact strength, and low moisture absorption. Gaps in mobile pieces like the clamp hinge and rotatable locking mechanism may incorporate weather-resistant rubbers or elastomers for gaskets and seals, ensuring protection against moisture and debris. High-performance thermoplastic polyurethanes (TPU) offering excellent abrasion resistance and flexibility; as such, they may be incorporated in embodiments that emphasize protection to mobile parts of the system 100. In a preferred embodiment, components of the system 100 routinely subjected to high stress may be constructed from carbon fiber composites, providing exceptional strength and stiffness while remaining lightweight. In yet another preferred embodiment, outer-facing components of the system 100 are constructed from materials with resistance to wear, weather and impacts, such as reinforced thermoplastics including glass-filled nylon, UV stabilized polycarbonate, or composite materials like Kevlar-reinforced polymers. Other materials may be used for the construction or generalized manufacture of the disposed system 100 by one skilled in the art without departing from the inventive disclosure.

FIG. 9 depicts a flowchart 400 illustrating certain preferred method steps that may be used to carry out the method of installing a system 100 for the muzzle-down mounting of a long-barreled firearm upon the door of a vehicle. Step 405 indicates the beginning of the method. During Step 410, the user obtains a gun mount apparatus comprising an adjustable clamp with at least two paddles positioned opposite to one another, a rotatable locking mechanism, and a sliding rod with two rests sized for the mounting of a long-barreled firearm. During Step 415, the gun mount apparatus is placed upon a vehicle door such that the clamp is set upon the door handle. This clamp is tightened in Step 420 via manipulation of the clamp knob or knobs. The rotatable locking mechanism is adjusted during Step 425 such that the sliding rod and associated rests fit easily within the frame of the door. In a preferred embodiment, the final angle of the rotatable locking mechanism is such that the front end of the sliding bar is lower than the back end of the same. During Step 430, the sliding rod is fixed into its preferred angle by tightening the locking knob. In a preferred embodiment, the firearm is mounted on the installed gun mount apparatus to ensure it has been installed and adjusted properly for the vehicle. The user then proceeds to the terminal step 435 to end the method.

This method step represents a significant improvement over the prior art in its simplicity and non-reliance on tools, powered or otherwise. The gun mount apparatus as described needs only ordinary manual dexterity to assemble and install, unlike gun mounts that must be nailed, screwed, or bolted into the physical doorframe. Furthermore, the implementation of a sliding rod that can be adjusted so the gun points down instead of up is a meaningful improvement in safety in the event of accidental discharge. The manipulation of knobs to affix the gun mount apparatus furthermore does not damage the door and facilitates easy removal when the transportation of firearms is complete. This feature is especially beneficial for those who use their vehicles for both work and recreational purposes. Additionally, the non-damaging nature of the installation method addresses concerns related to vehicle warranties and leases. Many vehicle manufacturers and leasing companies have strict policies against modifications that alter the vehicle's structure. By avoiding permanent alterations, this gun mount apparatus allows users to comply with such policies while still securely transporting their firearms. Overall, these improvements collectively address key pain points associated with traditional gun mounts, offering a more user-friendly, adaptable, and safety-conscious solution for firearm transportation in vehicles.

The implementations set forth in the foregoing description do not represent all implementations consistent with the subject matter described herein but are examples consistent with the disclosed subject matter. Although variations have been described in detail above, other modifications or additions may be possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter may be made without departing from the principles and scope of the present disclosure.

What we claim is:

1. A gun mount apparatus, comprising:

an adjustable clamp configured to attach to a vehicle door handle, wherein said adjustable clamp comprises at least two opposing paddles, at least one of said at least two opposing paddles being a mobile paddle movable about a pivot to tighten said at least two opposing paddles against the vehicle door handle;

a rotatable locking mechanism operably connected to said adjustable clamp; and a sliding rod extending through said rotatable locking mechanism, wherein said sliding rod comprises two ends, each end having a U-shaped rest configured to support a firearm in a muzzle-down orientation, wherein said two U-shaped rests open in the same direction such that a firearm is receivable within both rests simultaneously.

2. The gun mount apparatus of claim 1, wherein said adjustable clamp comprises at least one clamp knob configured to adjust a position of at least one of said at least two opposing paddles.

3. The gun mount apparatus of claim 1, wherein said rotatable locking mechanism comprises a locking knob configured to secure said sliding rod at a desired angle.

4. The gun mount apparatus of claim 3, wherein said rotatable locking mechanism further comprises a locking plate with complementary grooves to said rotatable locking mechanism, configured to engage when said locking knob is tightened.

5. The gun mount apparatus of claim 1, wherein said sliding rod is telescoping, allowing for adjustment of its length.

6. The gun mount apparatus of claim 1, wherein said U-shaped rest is lined with a non-slip material.

7. The gun mount apparatus of claim 6, wherein said non-slip material is selected from the group consisting of silicone, rubber, and neoprene.

8. A method of installing a gun mount apparatus on a vehicle door, comprising:

obtaining a gun mount apparatus comprising an adjustable clamp with at least two opposing paddles, a rotatable locking mechanism, and a sliding rod, wherein said sliding rod comprises at least two U-shaped rests configured to support a firearm in a muzzle-down orientation, said at least two U-shaped rests opening in the same direction such that a firearm is receivable within both rests simultaneously;

positioning said adjustable clamp on a door handle of the vehicle door;

tightening said adjustable clamp onto said door handle;

adjusting an angle of said rotatable locking mechanism to adjust a position of said at least two U-shaped rests; and securing said rotatable locking mechanism in a way such that said at least two U-shaped rests are locked in said position.

9. The method of claim 8, further comprising additional steps of: adjusting a length of said sliding rod to fit within said vehicle door.

10. The method of claim 9, wherein adjusting said length of said sliding rod requires telescoping said sliding rod.

11. The method of claim 8, further comprising additional steps of: lining said at least two U-shaped rests with a non-slip material.

12. The method of claim 11, wherein said non-slip material is selected from the group consisting of silicone, rubber, and neoprene.

13. The method of claim 8, wherein tightening said adjustable clamp requires manipulation of at least one clamp knob to adjust a position of at least one of said at least two opposing paddles.

14. The method of claim 8, wherein securing said rotatable locking mechanism requires manipulation of a locking knob to engage a locking plate with complementary grooves to said rotatable locking mechanism.

15. A system for affixing a firearm to a door of a vehicle, comprising:

a clamp mechanism configured to attach to a vehicle door handle without permanent modification to said vehicle, said clamp mechanism comprising at least two opposing paddles, at least one of said at least two opposing paddles being movable about a pivot to tighten said clamp mechanism against the vehicle door handle;

a rotatable locking mechanism connected to said clamp mechanism; and an adjustable support member extending through said rotatable locking mechanism, wherein said adjustable support member comprises two firearm rests configured to hold a firearm in a muzzle-down orientation, wherein said two firearm rests open in the same direction such that a firearm is receivable within both rests simultaneously.

16. The system of claim 15, wherein said clamp mechanism further comprises at least one clamp knob configured to adjust a position of at least one of said at least two opposing paddles.

17. The system of claim 16, wherein said rotatable locking mechanism comprises a locking knob configured to secure said adjustable support member at a desired angle.

18. The system of claim 17, wherein said rotatable locking mechanism further comprises a locking plate with complementary grooves to said rotatable locking mechanism, configured to engage when said locking knob is tightened.

19. The system of claim 18, wherein said adjustable support member is telescoping, allowing for adjustment of its length.

20. The system of claim 19, wherein said firearm rests are lined with a non-slip material selected from said group consisting of silicone, rubber, and neoprene.

* * * * *